US008327057B1

(12) United States Patent
Venkatramani et al.

(10) Patent No.: US 8,327,057 B1
(45) Date of Patent: Dec. 4, 2012

(54) ORDERING WRITE BURSTS TO MEMORY

(75) Inventors: Anjan Venkatramani, Los Altos, CA (US); Srinivas Perla, San Jose, CA (US); John Keen, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 479 days.

(21) Appl. No.: 11/829,634

(22) Filed: Jul. 27, 2007

Related U.S. Application Data

(60) Provisional application No. 60/911,974, filed on Apr. 16, 2007.

(51) Int. Cl.
*G06F 12/02* (2006.01)
(52) U.S. Cl. ...... 711/5; 711/158; 711/168; 711/E12.002
(58) Field of Classification Search ................... 711/106, 711/151, 158
See application file for complete search history.

(56) References Cited

U.S. PATENT DOCUMENTS

| | | | | |
|---|---|---|---|---|
| 3,639,682 A * | 2/1972 | Benmussa et al. | ................. | 178/3 |
| 4,598,362 A * | 7/1986 | Kinjo et al. | ................... | 711/148 |
| 6,119,199 A * | 9/2000 | Isobe | ............................... | 711/5 |
| 6,137,807 A * | 10/2000 | Rusu et al. | .................... | 370/429 |
| 6,539,487 B1 * | 3/2003 | Fields et al. | .................. | 713/340 |
| 6,741,256 B2 * | 5/2004 | Emberling | ................... | 345/540 |
| 7,107,386 B1 * | 9/2006 | Purcell et al. | ...................... | 711/5 |
| 2003/0051108 A1 * | 3/2003 | Chen et al. | .................... | 711/158 |
| 2003/0120861 A1 * | 6/2003 | Calle et al. | .................... | 711/105 |
| 2005/0132146 A1 * | 6/2005 | Kim et al. | ...................... | 711/151 |
| 2006/0026342 A1 * | 2/2006 | Calvignac et al. | ............ | 711/105 |
| 2007/0038798 A1 * | 2/2007 | Bouchard et al. | ................. | 711/3 |

OTHER PUBLICATIONS

Scott Rixner. "Memory Controller Optimizations for Web Servers." Dec. 2004. IEEE. MICRO '04.*
Kyle J. Nesbit, Nidhi Aggarwal, James Laudon, and James E. Smith. "Fair Queuing Memory Systems." Dec. 2006. IEEE. MICRO '06.*
Scott Rixner, William J. Dally, Ujval J. Kapasi, Peter Mattson, and John D. Owens. "Memory Access Scheduling." 2000. IEEE. ISCA '00.*
Jun Shao and Brian T. Davis. "A Burst Scheduling Access Reordering Mechanism." Feb. 2007. IEEE. HPCA '07.*
R. L. Graham. "Bounds on Multiprocessing Timing Anomalies." Mar. 1969. SIAM Journal on Applied Mathematics. vol. 17. No. 2. pp. 416-429.*
Tomas Rokicki. "Indexing Memory Banks to Maximize Page Mode Hit Percentage and Minimize Memory Latency." Jun. 2003. HP Labs. HPL-96-95 (R.1).*
Zhao Zhang, Zhichun Zhu, and Xiaodong Zhang. "A Permutation-based Page Interleaving Scheme to Reduce Row-buffer Conflicts and Exploit Data Locality." Dec. 2000. IEEE. MICRO-33.*
T.H. Cormen et al., "Chapter 17, Greedy Algorithms" *Introduction to Algorithms*, MIT Electrical Engineering and Computer Science Series, Copyright date 1990, pp. 329-355, 35 pgs.
J.M. Frailong et al., "XOR-Schemes: A Flexible Data Organization in Parallel Memories", 1985 International Conference on Parallel Processing, IEEE Computer Society, pp. 276-283, Aug. 1985.

* cited by examiner

*Primary Examiner* — Charles Rones
*Assistant Examiner* — Nathan N Sadler
(74) *Attorney, Agent, or Firm* — Harrity & Harrity, LLP

(57) ABSTRACT

A device may receive requests intended for a memory that includes a number of banks, determine a number of the requests intended for each of the banks, determine an order for the requests based on the determined number of the requests intended for each of the banks, and send one of the requests to the memory based on the determined order.

18 Claims, 11 Drawing Sheets

| CLOCK CYCLE | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| BANK 1 → 1 | 0 | NA | NA | NA | 0 | 0 | 0 | 0 | 0 | 0 | 0 | 0 | 0 | 0 |
| BANK 2 → 1 | 1 | 0 | NA | NA | NA | 0 | 0 | 0 | 0 | 0 | 0 | 0 | 0 | 0 |
| BANK 3 → 1 | 1 | 1 | 0 | NA | NA | NA | 0 | 0 | 0 | 0 | 0 | 0 | 0 | 0 |
| BANK 4 → 1 | 1 | 1 | 1 | 0 | NA | NA | NA | 0 | 0 | 0 | 0 | 0 | 0 | 0 |
| BANK 5 → 1 | 1 | 1 | 1 | 1 | 0 | NA | NA | NA | 0 | 0 | 0 | 0 | 0 | 0 |
| BANK 6 → 3 | 3 | 3 | 3 | 3 | 3 | 2 | NA | NA | NA | 1 | NA | NA | NA | 0 |
| BANK SERVICED: | 1 | 2 | 3 | 4 | 5 | 6 | – | – | – | 6 | – | – | – | 6 |

NO. OF PENDING WRITE REQUESTS

NA : NOT AVAILABLE
– : IDLE CLOCK CYCLE

| | CLOCK CYCLE | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| NO. OF PENDING WRITE REQUESTS | BANK 6 ⟶ 3 | 2 | NA | NA | NA | 1 | NA | NA | NA | 0 | NA | NA | NA | 0 | 0 |
| | BANK 1 ⟶ 1 | 1 | 0 | NA | NA | NA | 0 | 0 | 0 | 0 | 0 | 0 | 0 | 0 | 0 |
| | BANK 2 ⟶ 1 | 1 | 1 | 0 | NA | NA | NA | 0 | 0 | 0 | 0 | 0 | 0 | 0 | 0 |
| | BANK 3 ⟶ 1 | 1 | 1 | 1 | 0 | NA | NA | NA | 0 | 0 | 0 | 0 | 0 | 0 | 0 |
| | BANK 4 ⟶ 1 | 1 | 1 | 1 | 1 | 1 | 0 | NA | NA | NA | 0 | 0 | 0 | 0 | 0 |
| | BANK 5 ⟶ 1 | 1 | 1 | 1 | 1 | 1 | 1 | 0 | NA | NA | NA | 0 | 0 | 0 | 0 |
| BANK SERVICED: | | 6 | 1 | 2 | 3 | 6 | 4 | 5 | — | 6 | — | — | — | — | — |

NA : NOT AVAILABLE
— : IDLE CLOCK CYCLE

ORDERING WRITE BURSTS TO MEMORY

RELATED APPLICATION

This application claims priority from U.S. Provisional Application No. 60/911,974, filed Apr. 16, 2007, entitled "MEMORY SCHEMES," the content of which is hereby incorporated by reference.

BACKGROUND

Network devices, such as routers, receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was added.

To meet the new demands, purpose-built routers were designed. Purpose-built routers are designed and built with components optimized for routing. These routers not only handle higher line rates and higher network traffic volume, but they also add functionality without compromising line rate performance.

SUMMARY

According to one aspect, a data processing device may include a memory that includes a number of banks. The data processing device may also include a control block to receive requests intended for the memory, determine a number of the requests intended for each of the banks, determine an order for the requests based on the determined number of the requests intended for each of the banks, and send one of the requests to the memory based on the determined order.

According to another aspect, a method may include receiving requests intended for a memory that includes a number of banks; determining a number of the requests intended for each of the banks; determining an availability of each of the banks; determining an order for servicing the requests based on the determined number of the requests intended for each of the banks and the availability of each of the banks; and sending one of the requests to the memory based on the determined order.

According to yet another aspect, a system may include means for receiving requests intended for a memory that includes a number of banks; means for determining a number of the requests intended for each of the banks; means for determining a servicing order for servicing the banks, where a first one of the banks with a larger number of the requests intended for the first bank may be included earlier in the servicing order than a second one of the banks with a smaller number of the requests intended for the second bank; and means for sending one of the requests to the memory based on the servicing order.

According to a further aspect, a data processing device may include a memory that includes a number of banks. The control block may receive requests intended for the memory, determine a number of the requests intended for each of the banks, determine an availability of each of the banks, and send one of the requests to a first one of the banks when the first bank has a larger number of the requests intended for the first bank than other ones of the banks and the first bank is available.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 10 is a diagram that illustrates a round robin order for servicing write requests; and FIG. 11 is a diagram that illustrates an order for servicing write requests based on bank popularity and availability.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein provide techniques for ordering write requests for servicing by a memory device. In the description to follow, the memory device will be described as a control memory of a network device that stores data structures for use in processing packets. In other implementations, the memory device may be included in another type of data processing device and may store other types of data.

Exemplary Data Processing Device

Figure 1:
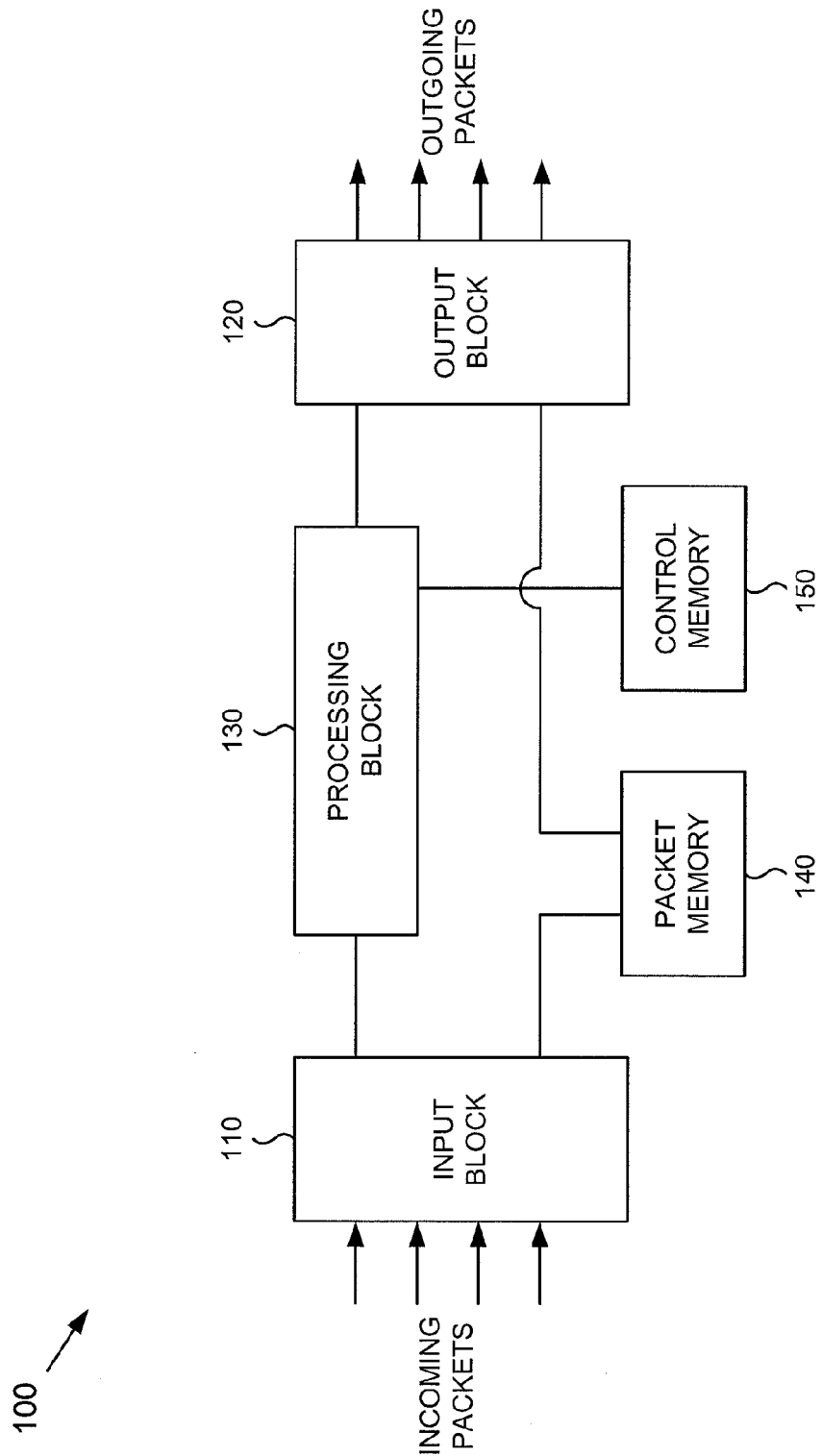
FIG. 1 is a diagram of an exemplary data processing device in which systems and methods described herein may be implemented.

FIG. 1 is a diagram of an exemplary data processing device 100 in which systems and methods described herein may be implemented. Device 100 may include input block 110, output block 120, processing block 130, packet memory 140, and control memory 150.

Input block 110 may include one or more input units (e.g., input line cards) that may receive packets on ingress links and perform initial processing on the packets. In one implementation, the initial processing may include analyzing a packet to identify its control information and its packet data (e.g., payload). The control information may include information from the header of the packet, and the packet data may include information from a payload of the packet. In one implementation, the control information may include a source address and/or a destination address from a header of a packet. In another implementation, the control information may include a source address, a destination address, priority information, and/or other information from a header of the packet. Output block 120 may include one or more output units (e.g., output line cards) that may receive packet information from processing block 130 and/or packet memory 140, construct packets from the packet information, and output the packets on egress links.

Processing block 130 may include processing logic that may perform routing functions and handle packet transfers between input block 110 and output block 120. Processing block 130 may receive the control information from input block 110 and process the control information based on data structures stored in control memory 150. When processing the control information, processing block 130 may make certain requests to control memory 150 to read and/or write data.

Figure 2:
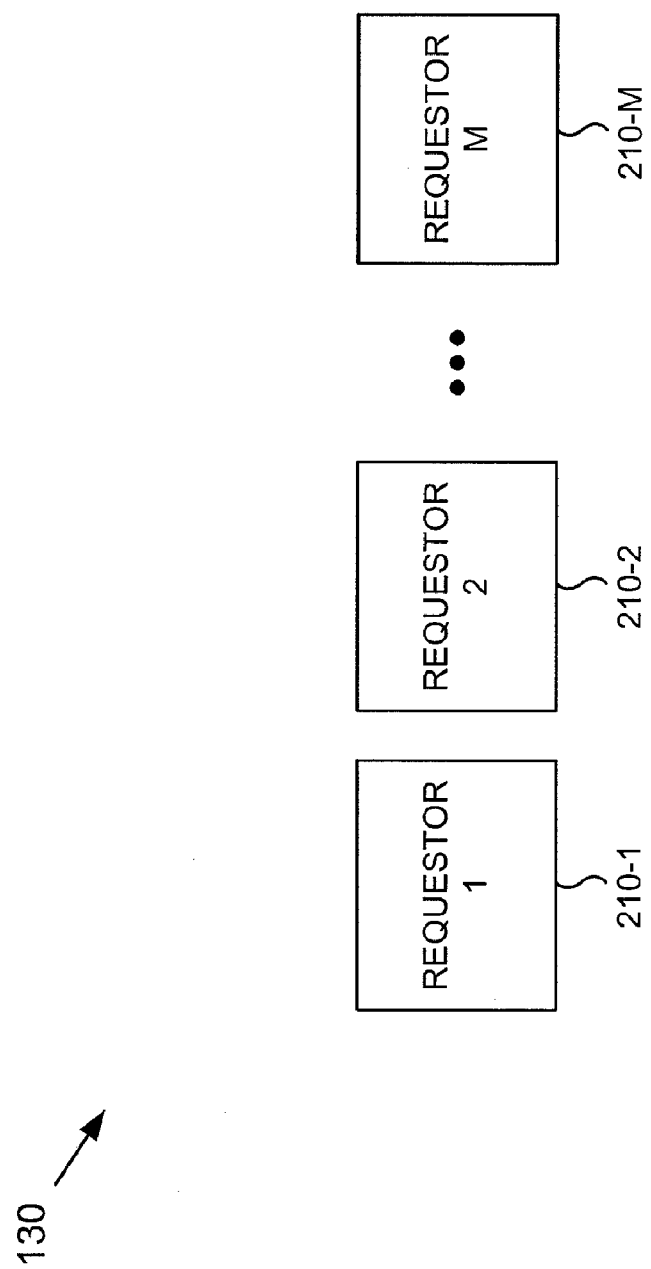
FIG. 2 is a diagram of an exemplary portion of the processing block of FIG. 1.

FIG. 2 is a diagram of an exemplary portion of processing block 130. Processing block 130 may include multiple requestors 210-1, 210-2, . . . , 210-M (where M>1) (collectively referred to herein as "requestors 210"). Requestors 210 may operate independently of each other and/or in parallel. Each of requestors 210 may include processing logic to process control information associated with a particular packet. Each of requestors 210 may make requests to control memory 150 to read and/or write data to assist in the processing of the control information. In one implementation, a requestor 210 may determine how to forward a packet (e.g., determine on which egress link the packet should be transmitted), collect particular statistics regarding the packet, and/or perform one or more management functions with regard to the packet.

Returning to FIG. 1, packet memory 140 may include a memory device, such as a dynamic random access memory (DRAM). Packet memory 140 may store packet data associated with packets received by input block 110. In one implementation, packet memory 140 may store the packet data as a variable length data unit. In another implementation, packet memory 140 may store the packet data as fixed length data units. In this case, the packet data may be divided into one or more of the data units of the fixed length and stored in contiguous or non-contiguous locations in packet memory 140. If stored in non-contiguous locations, data structures, such as linked lists, may be used to identify the data units associated with a particular packet.

Control memory 150 may include a memory device, such as a DRAM or a reduced-latency DRAM (RLDRAM). Control memory 150 may store data structures to assist in the processing of packets. In one implementation, the data structures might include a routing table, a forwarding table, statistics, and/or management data (e.g., quality of service (QoS) parameters).

Figure 3:
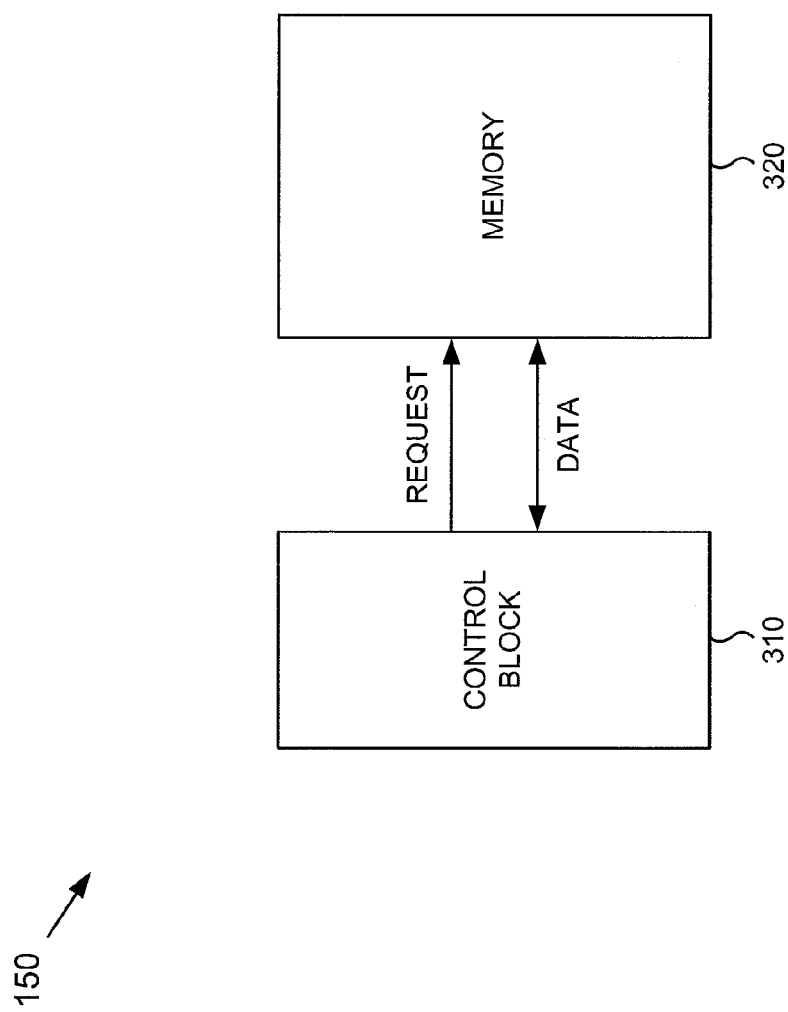
FIG. 3 is a diagram of an exemplary portion of the control memory of FIG. 1.

FIG. 3 is a diagram of an exemplary portion of control memory 150. Control memory 150 may include a control block 310 and a memory 320. Control block 310 may include logic that regulates access to memory 320. For example, control block 310 may receive requests from requestors 210 and regulate the sending of the requests to memory 320. In this case, control block 310 may function as an arbiter that arbitrates among the requests. Control block 310 may connect to memory 320 via one or more buses over which requests can be sent to memory 320 and data can be written to or read from memory 320.

Figure 4:
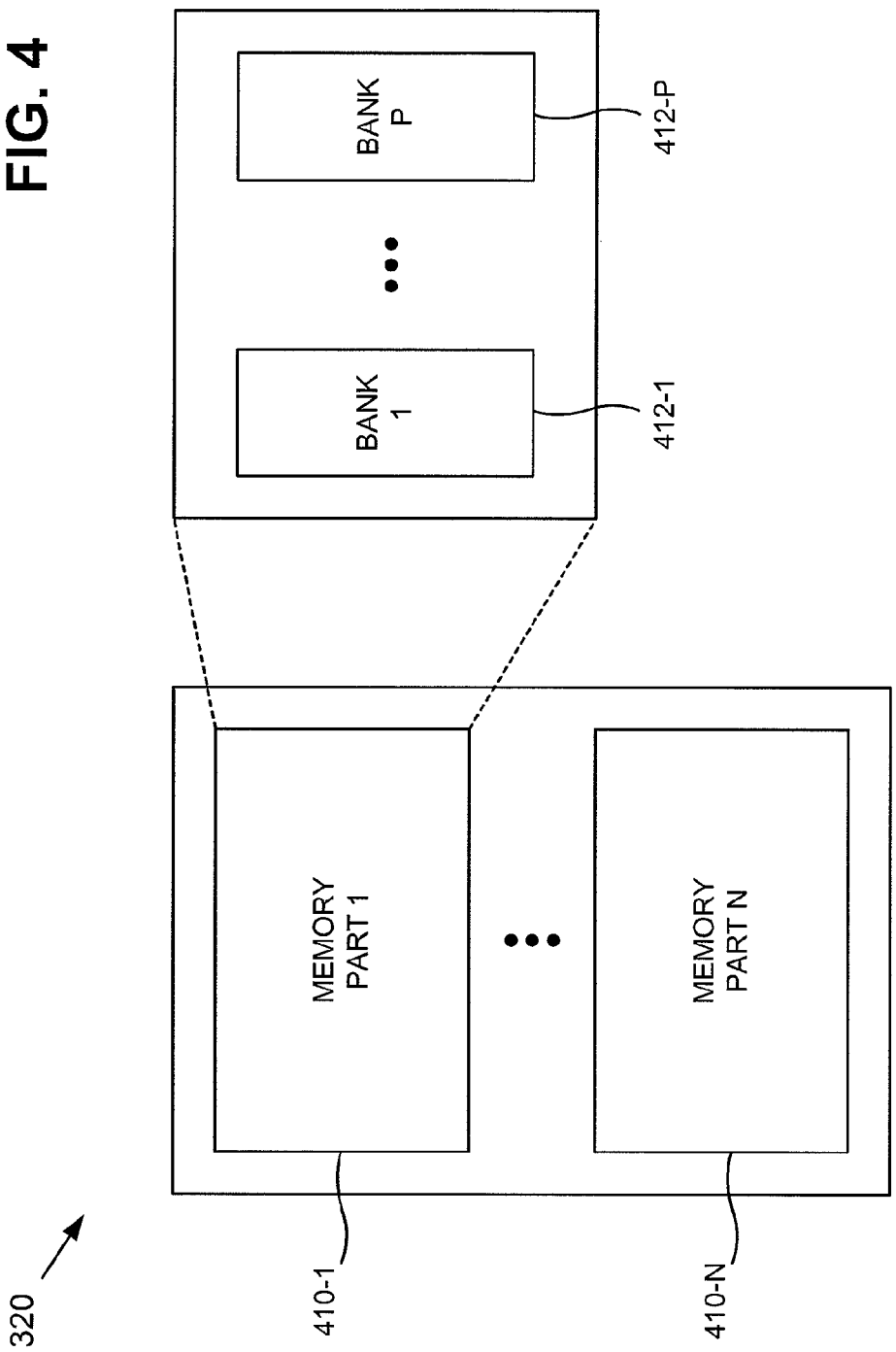
FIG. 4 is a diagram of an exemplary portion of the memory of FIG. 3.

Memory 320 may store the data structures. FIG. 4 is a diagram of an exemplary portion of memory 320. Memory 320 may include memory parts 410-1, . . . , 410-N (where N>1) (collectively referred to herein as "memory parts 410"). In one implementation, each of memory parts 410 may store a replicated set of data. In another implementation, each of memory parts 410 may store a different set of data. Control block 310 may include a separate bus for each of memory parts 410, such that a separate request can be sent concurrently to each of memory parts 410. In this case, memory parts 410 may operate independently of each other. Reads may be performed on one of memory parts 410. Writes may be performed on all or multiple ones of memory parts 410 to maintain consistency.

Each of memory parts 410 may be organized into banks 412-1, . . . , 412-P (where P>1) (collectively referred to herein as "banks 412"). In one implementation, banks 412 may store data associated with any of requestors 210. In this case, any of requestors 210 may access any of banks 412. In another implementation, each of banks 412 may store data associated with a particular one or more of requestors 210. In this case, a particular one of banks 412 may be assigned to one or more of requestors 210.

Memory 320 may have a number of constraints that control access to memory 320. For example, memory 320 may have a restriction on how often a particular bank 412 can be accessed. For example, a restriction may specify that a certain number of clocks cycles (e.g., 3 clock cycles) pass between one access of a bank 412 and a next access of that same bank 412 (herein referred to as "bank access delay"). Memory 320 may also have a turnaround delay (e.g., one clock cycle where no operation can be performed on the bus to a memory part 410) every time there is a switch between a read from and a write to memory 320. Memory 320 may further have a predetermined refresh constraint. The refresh constraint may indicate the intervals at which a refresh operation is performed on each of memory parts 410.

Exemplary Packet Forwarding Process

Figure 5:
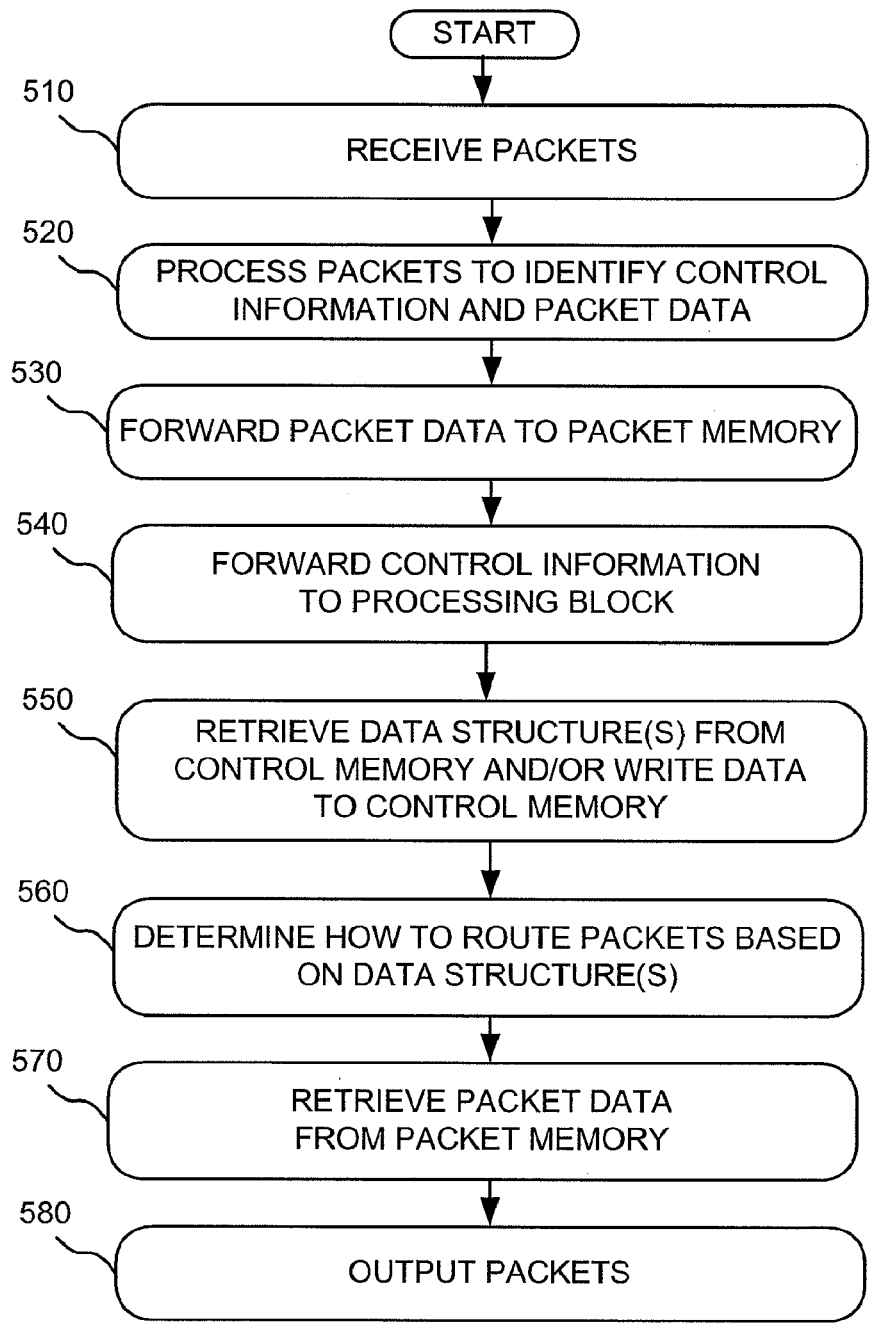
FIG. 5 is a flowchart of an exemplary process for forwarding a packet by the data processing device of FIG. 1.

FIG. 5 is a flowchart of an exemplary process for forwarding a packet by data processing device 100. Processing may begin with packets being received (block 510). For example, input block 110 may receive packets on one or more ingress links. The packets may be associated with a single stream of packets received on a particular ingress link or multiple streams of packets received on multiple ingress links.

The packets may be processed to identify their control information and their packet data (block 520). For example, input block 110 may analyze the packets to determine control information and packet data associated with the packets. As described above, the control information may be retrieved from the header of the packets and the packet data may be retrieved from the payload of the packets.

The packet data may be forwarded to packet memory 140 and the control information may be forwarded to processing block 130 (blocks 530 and 540). For example, input block 110 may send the packet data for storage in packet memory 140. As described above, the packet data associated with a particular packet may be stored in packet memory 140 as a variable sized data unit or as one or more fixed sized data units.

One or more data structures may be retrieved from control memory 150 and/or data may be written to control memory 150 (block 550). For example, a requestor 210 of processing block 130 may process control information associated with a packet. Requestor 210 may retrieve one or more data structures, such as a forwarding table, a routing table, and/or management data, from control memory 150. Requestor 210 may also, or alternatively, write one or more data structures, such as statistics data, to control memory 150. Requestor 210 may read or write data by sending a request to control memory 150. Requestors 210 may operate independently from each other and, thus, the requests from requestors 210 can form an unpredictable (almost random) access pattern across banks 412 of control memory 150.

It may be determined how to route the packets based on the one or more data structures retrieved from control memory 150 (block 560). For example, requestor 210 may process the control information for a packet based on the forwarding table, routing table, and/or management data to determine how the packet should be routed (e.g., on which egress link the packet should be transmitted, the priority to be given to the packet, etc.). Requestor 210 may send its processing results to output block 120. The processing results may identify the packet and the egress link on which the packet should be transmitted and might include header information associated with the packet.

Packet data may be retrieved from packet memory 140 (block 570). For example, output block 120 may receive processing results for a packet from a requestor 210 of processing block 130. Output block 120 may retrieve the packet data corresponding to the packet from packet memory 140 and reassemble the packet based on the packet data and the processing results from requestor 210.

The packets may be outputted on one or more egress links (block 580). For example, output block 120 may transmit the packets based on the processing results from requestors 210 of processing block 130.

Exemplary Functional Block Diagram of Data Processing Device

Figure 6:
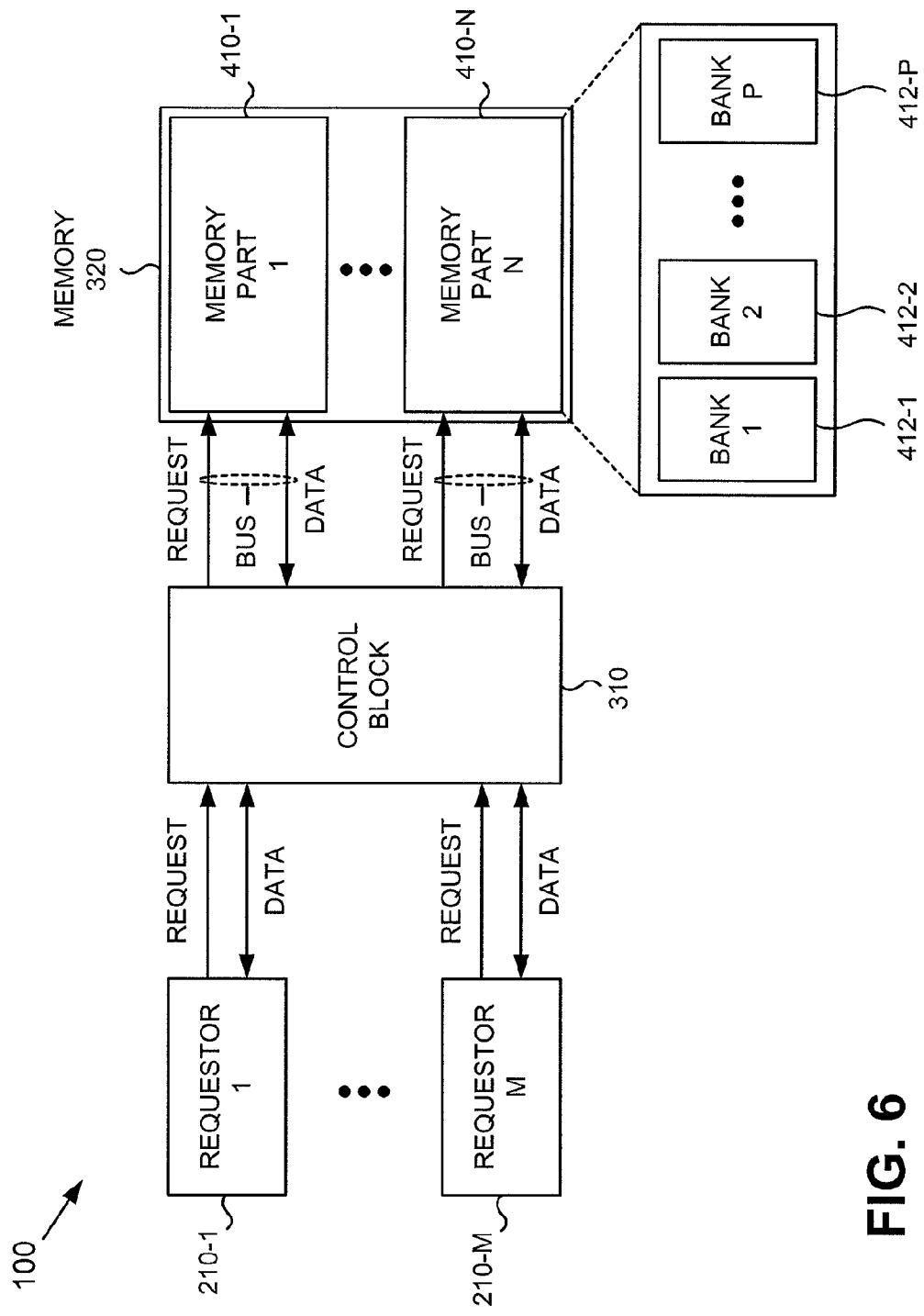
FIG. 6 is a functional block diagram of an exemplary portion of the data processing device of FIG. 1.

Implementations described herein may relate to regulating access to control memory 150 by requestors 210, as described generally with regard to block 550. FIG. 6 is a functional block diagram of an exemplary portion of data processing device 100. As shown in FIG. 6, data processing device 100 may include requestors 210 connected to memory parts 410 of memory 320 via control block 310.

Each of requestors 210 may send requests to control block 310 for access to memory 320. Control block 310 may function as an arbiter to regulate the sending of the requests to memory parts 410 of memory 320. Control block 310 may operate under certain memory constraints. For example, there may be a certain (finite) delay to read or write data (e.g., a bank 412 may be inaccessible for a certain number of clock cycles after a read from or write to that bank 412). Also, there may be a certain (finite) delay to transition from a read operation to a write operation, or vice versa. Further, memory 320 may have a predetermined refresh constraint. Also, there may be a single bus between control block 310 and each of memory parts 410, as shown in FIG. 6. A single request may be sent from control block 310 to one of memory parts 410 on the bus during a given clock cycle.

Control block 310 may regulate access by requestors 210 to the data in memory parts 410 and banks 412. Control block 310 may receive requests from requestors 210. A request from a requestor 210 may include an address, a read/write signal, and a valid signal. The address may identify the location in memory 320 to read or write data. In one implementation, the lower ceiling($\log_2 P$) bits of the address (where ceiling( ) is a function that rounds up to the nearest integer) may identify a bank 412 to be accessed. The read/write signal may identify the request as either a request to read data ("read request") or a request to write data ("write request"). The valid signal may identify whether the request is valid.

Control block 310 may use information regarding reads and writes as a factor in selecting a request to be serviced. In one implementation, memory 320 may have a turnaround delay (e.g., one clock cycle where no operation can be performed on the bus to a memory part 410) every time there is a switch between a read and a write. To minimize delay, control block 310 may group read requests together and group write requests together. Typically, there may be many more requests to read from memory 320 than requests to write to memory 320. Accordingly, control block 310 may gather write requests until a sufficient number of write requests are collected. Control block 310 may then perform a burst of writes to memory 320.

As explained above, memory 320 may have a predetermined refresh constraint. The refresh constraint may indicate the intervals at which a refresh operation is performed. The length of the burst of writes may be programmable to guarantee that the burst finishes prior to the time that the next refresh operation is performed. The length of the burst of writes may be specified as a bus hold time. The bus hold time may be a programmable maximum amount of time that write requestor(s) can hold the bus for write requests.

Based on these memory constraints, control block 310 may attempt to minimize the amount of time that the buses to memory parts 410 are held for performing a write burst. Thus, control block 310 may send the write burst to memory 320 with the goal of servicing a maximum number of write requests in the shortest possible amount of time. To achieve this goal, control block 310 may order the write requests based on the number of write requests pending to banks 412 and the availability of banks 412.

Figure 7:
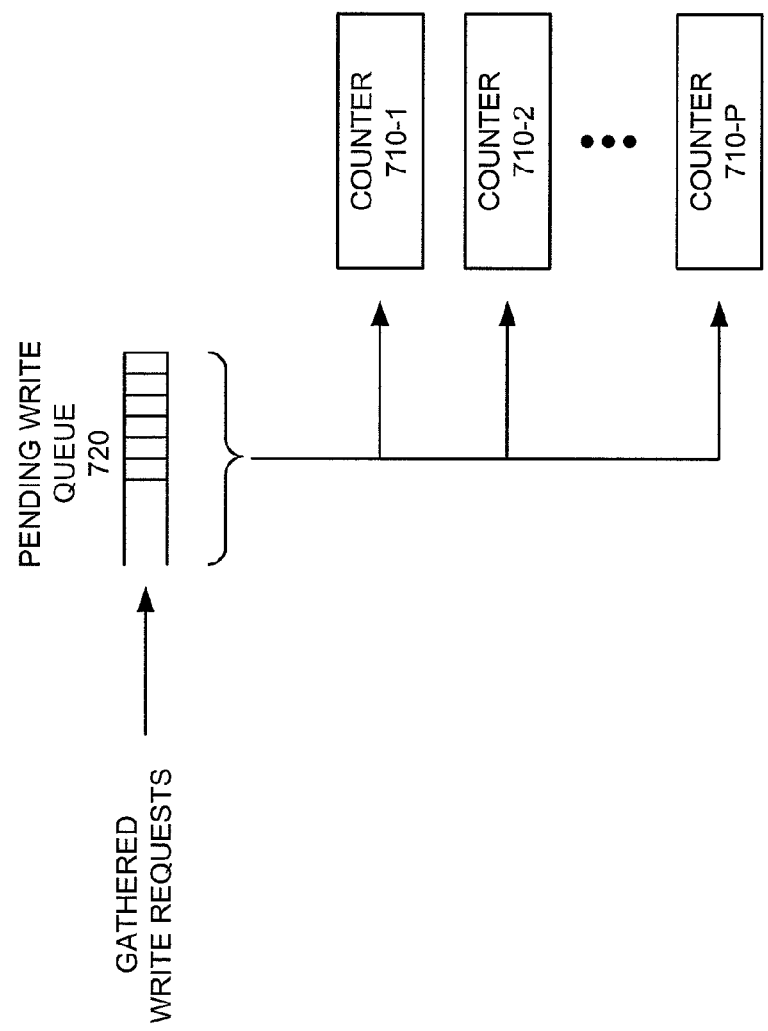
FIG. 7 is a diagram of exemplary counters that may be used to determine a number of write requests pending for each bank.

FIG. 7 is a diagram of exemplary counters that may be used to determine a number of write requests pending for each bank. As shown in FIG. 7, control block 310 may maintain a number of counters 710-1, ..., 710-P (collectively referred to as "counters 710") that may be associated with banks 412-1, ..., 412-P of one of memory parts 410. Similar counters may be associated with banks 412 of the other one of memory parts 410.

In one implementation, control block 310 may store the gathered write requests (i.e., the write requests to be included in a write burst) in a pending write queue 720. Control block 310 may analyze the write requests in write queue 720 to identify the banks to which the write requests are intended based, for example, on the lower ceiling($\log_2 P$) (e.g., 3) bits of the addresses associated with the requests. Control block 310 may set each of counters 710 to a count value equal to the number of pending write requests intended for the corresponding bank 412. Control block 310 may decrement the count value for one of counters 710 when a write request is serviced for the associated bank 412.

Figure 8:
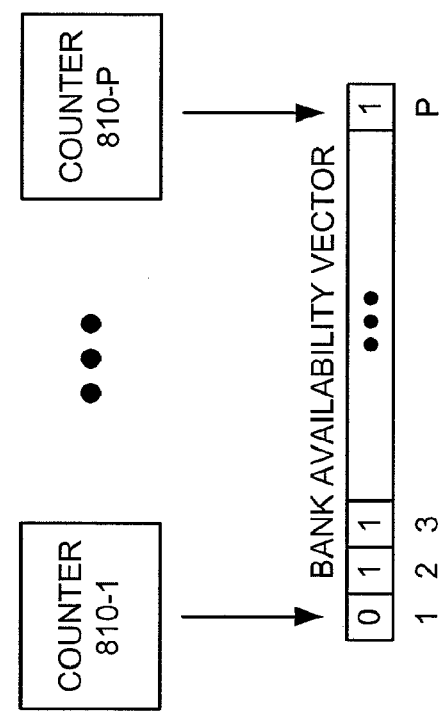
FIG. 8 is a diagram of exemplary counters that may be used to determine bank availability.

To identify which banks 412 are available in memory 320 to service requests, control block 310 may maintain a number of counters. FIG. 8 is a diagram of exemplary counters that may be used to determine bank availability. As shown in FIG. 8, control block 310 may maintain a number of counters 810-1, ..., 810-P (collectively referred to as "counters 810") that may be associated with banks 412-1, ..., 412-P of one of memory parts 410. Similar counters may be associated with banks 412 of the other one of memory parts 410.

In one implementation, each of counters 810 is set to a predetermined value whenever a request is sent to the corresponding bank 412. The predetermined value may correspond to the bank access delay (in clock cycles) associated with banks 412. Thus, a counter 810 may reflect how many clock cycles to wait before another access to the corresponding bank 412 can occur. In one implementation, counters 810 may count downward from the predetermined value to a zero value. Any counter 810 with a non-zero count value may indicate that the corresponding bank 412 is unavailable for access. Any counter 810 with a zero count value may indicate that the corresponding bank 412 is available for access.

Control block 310 may generate a bank availability vector for each of memory parts 410 based on the count values of counters 810. The bank availability vector may indicate whether each of the corresponding banks 412 is available for access. The bank availability vector may include a number of bits corresponding to the number of banks 412. A bit may be set to a first value to indicate that the corresponding bank 412 is available or to a second value to indicate that the corresponding bank 412 is unavailable. In one implementation, control block 310 may generate a bank availability vector in each clock cycle to indicate which banks 412 are available during that clock cycle. For example, assume that counters 810 indicate that banks 412-2, 412-3, and 412-P are available and the other banks 412 are unavailable. In this case, control block 310 may generate a bank availability vector in which bit 2, bit 3, and bit P are set to the first value and the other bits are set to the second value, as shown in FIG. 8.

Figure 9:
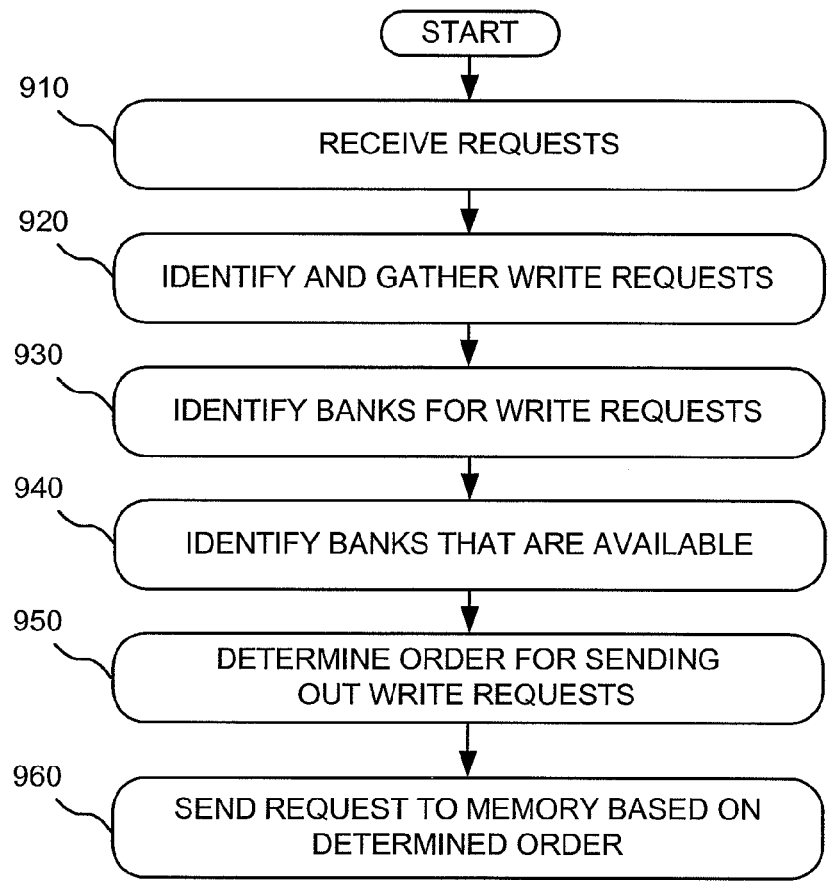
FIG. 9 is a flowchart of an exemplary process for servicing write requests.

FIG. 9 is a flowchart of an exemplary process for servicing write requests. In one implementation, the process described below may occur in a given clock cycle and may be repeated in subsequent clock cycles.

Processing may begin with requests being received (block 910). For example, during a given clock cycle, control block 310 may receive a set of requests from a corresponding set of requestors 210. Control block 310 may identify valid requests based, for example, on valid signals included with the requests.

Write requests may be identified from the received requests and gathered together (block 920). For example, control block 310 may analyze the read/write signals associated with the requests to differentiate write requests from read requests. Control block 310 may store the gathered write requests in pending write queue 720. Control block 310 may gather write requests until a sufficient number of write requests have been gathered. For example, control block 310 may gather enough write requests such that the write requests can all be performed within the programmable bus hold time. If the bus hold time was set to 32 clock cycles, for example, then control block 310 might gather 8 write requests. If these 8 write requests were all intended for the same bank 412, then it would take 32 clock cycles to service the writes (i.e., 8 writes×4 clock cycles (including bank access delay)). If, on the other hand, these 8 write requests were intended for different banks 412, then it would take just 8 clock cycles to service the writes (i.e., 8 writes×1 clock cycle). In this case, control block 310 may gather 8 write requests because the 8 write requests may be serviced within the bus hold time even in a worst case scenario (e.g., where all 8 requests are intended for the same bank 412).

Banks 412 for which requests have been received may be determined (block 930). For example, control block 310 may process a write request in pending write queue 720 to analyze the lower ceiling($log_2P$) (e.g., 3) bits of the address to identify a bank 412 for which the request is intended. Control block 310 may set count values in counters 710 based on the number of write requests pending for the corresponding banks 412.

Banks 412 that are available (per memory part 410) may be identified (block 940). For example, control block 310 may analyze the count values of counters 810 corresponding to banks 412. Control block 310 may generate a bank availability vector, based on the count values, that identifies which of banks 412 are available to service a request. As described above, a zero count value may indicate a bank 412 that is available.

An order for sending the write requests to memory 320 may be determined (block 950). For example, control block 310 may determine an order for the write requests based on the number of write requests pending for each of banks 412 and the availability of banks 412. In one implementation, control block 310 may determine an order such that more "popular" banks 412 (e.g., banks 412 with more pending write requests) are serviced sooner than less popular banks 412 (e.g., banks 412 with fewer pending write requests). For example, control block 310 may order banks 412 based on the number of write requests that are pending. When two or more banks 412 have the same number of pending write requests, then control block 310 may select an arbitrary order for these banks 412.

A request may be sent to memory based on the determined order (block 960). For example, in a given clock cycle, control block 310 may select a write request to service for the most popular bank 412 if the most popular bank 412 is available. If the most popular bank 412 is not available, then control block 310 may select a write request to service for the next-most popular bank 412 if the next-most popular bank 412 is available. Control block 310 may determine the availability of banks 412 based, for example, on the bank availability vector generated for this clock cycle. Control block 310 may decrement the count value for counter 710 associated with whichever bank 412 is serviced. Control block 310 may also set the count value for counter 810, associated with whichever bank 412 is serviced, to the predetermined value.

Based on the foregoing, control block 310 may service a maximum number of write requests in a shortest possible amount of time. Consider two examples: a first example where write requests are serviced simply in a round robin fashion based on bank number; and a second example where write requests are serviced based on the number of pending requests for the banks and the availability of the banks. Assume for these examples that banks 0-5 have pending write requests. Assume that each of banks 0-4 has one pending write request, that bank 5 has three pending write requests, and all of the banks are available at clock cycle 0.

FIG. 10 is a diagram that illustrates the first example. As shown in FIG. 10, control block 310 may service the write requests for banks 0-5 in a round robin fashion. In this case, it takes 14 clock cycles to service all of the pending write requests. Due to the bank access delay associated with banks 0-5, six clock cycles occur in which no write request can be serviced (i.e., clock cycles 6-8 and 10-12). In this case, these six clock cycles are idle while control block 310 waits for bank 5 to become available.

FIG. 11 is a diagram that illustrates the second example. Control block 310, at each clock cycle, may determine the bank that has the most pending write requests and service a write request for that bank if that bank is available. As shown in FIG. 11, control block 310 may service a write request for bank 6 (i.e., the most popular bank) in clock cycles 0 and 4 because bank 6 has more pending write requests than the other banks in those clock cycles and bank 6 is available. Control block 310 may service the other write requests in any particular order because the corresponding banks (i.e., banks 0-5) have the same number of pending write requests. In this case, it takes 9 clock cycles to service all of the pending write requests—5 clock cycles sooner than in the first example. Due to the bank access delay associated with the banks, only one clock cycle occurs in which no write request can be serviced (i.e., clock cycle 7).

CONCLUSION

Implementations described herein may provide techniques for ordering write requests for servicing by a memory device. The write requests may be ordered such that a maximum number of write requests can be serviced in a shortest possible amount of time.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 9, the order of the blocks may differ in other implementations. Also, non-dependent blocks may be performed in parallel.

Also, the preceding description referred to techniques for processing write requests. These techniques might also be used to process read requests.

Further, certain portions of the description referred to "logic" that performs one or more functions. This logic may include hardware, such as a processor, an application specific integrated circuit, or a field programmable gate array, software, or a combination of hardware and software.

It will also be apparent that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device, comprising:
   a memory that includes a plurality of banks; and
   a control block to:
      receive requests intended for the memory,
      store the received requests in a same queue,
      generate, for each clock cycle of a plurality of clock cycles, a bank availability vector that includes a plurality of bits, each of the plurality of bits corresponding to a different one of the plurality of banks, each of the plurality of bits indicating an availability of each corresponding bank, of the plurality of banks, the availability of each bank being based on a counter associated with each bank of the plurality of banks,
      determine a number of the requests intended for each of the plurality of banks based on addresses associated with the requests stored in the queue,
      determine an order for the requests based on the determined number of the requests intended for each of the banks,
      determine, after determining the order for the requests, whether a particular bank, of the plurality of banks, associated with a particular request, of the requests, that is first in the determined order, is available during a particular clock cycle, the control block determining whether the particular bank is available during the particular clock cycle based on the bit, of the plurality of bits included in the bank availability vector, indicating the availability of the particular bank, and
      service, during the particular clock cycle, the particular request for the particular bank when the particular bank is available during the particular clock cycle.

2. The device of claim 1, where the control block is further to identify ones of the requests that are write requests,
   where, when determining the number of the requests intended for each of the plurality of banks, the control block is further to determine a number of the write requests intended for each of the plurality of banks.

3. The device of claim 1, further comprising:
   the counters associated with the plurality of banks,
   where the control block is further to set each of the counters to a count value corresponding to the determined number of requests intended for each of the plurality of banks, and
   where the bank availability vector is generated based the counter value associated with each of the plurality of banks.

4. The device of claim 1, where, when determining the order for the requests, the control block is further to determine a servicing order for the plurality of banks, where a number of the requests intended for a first bank, of the plurality of banks, is greater than a number of the requests intended for a second bank of the plurality of banks, the first bank being included earlier in the servicing order than the second bank.

5. The device of claim 4, where, when servicing the particular request, the control block is further to service a request, of the requests, associated with the first bank before servicing a request, of the requests, associated with the second bank.

6. The device of claim 1, where, when the particular bank is not available during the particular clock cycle, the control block is further to:
   determine whether another bank, of the plurality of banks, associated with another request, of the requests, that is immediately after the particular request in the determined order, is available during the particular clock cycle, where the control block is to determine whether the other bank is available based on another bit, of the plurality of bits included in the bank availability vector, indicating the availability of the other bank, and
   service, during the particular clock cycle, the other request for the other bank when the other bit indicates that the other bank is available during the particular clock cycle.

7. The device of claim 1,
   where the control block is further to:
      determine that the particular bank is unavailable based on the bit, of the plurality of bits, that identifies the availability of the particular bank
      determine that another bank, of the plurality of banks, is available based on the bit, of the plurality of bits, that identifies the availability of the other bank, and
      service another request, of the requests, intended for the other bank based on:
         determining that the particular bank is unavailable, and
         determining that the other bank is available.

8. A method, comprising:
   receiving read and write requests intended for a memory that includes a plurality of banks;
   identifying the write requests, from the received read and write requests;
   storing the received write requests in a queue;

generating, for each clock cycle of a plurality of clock cycles, a bank availability vector that indicates an availability of each bank, of the plurality of banks;

determining, after a particular number of write requests have been stored in the queue, a number of the write requests intended for each of the plurality of banks based on addresses associated with the write requests stored in the queue;

determining an order for servicing the write requests, based on the determined number of the write requests intended for each of the plurality of banks;

determining, after determining the order for servicing the write requests, whether a particular bank, associated with a particular write request of the write requests, that is first in the determined order, is available during a particular clock cycle,
 determining whether the particular bank is available being based on a portion, of the bank availability vector, that is associated with the particular bank; and servicing, during the particular clock cycle, the particular write request for the particular bank when the particular bank is available.

9. The method of claim 8, further comprising:

setting each of a plurality of counters to a count value corresponding to the determined number of requests intended for a corresponding one of the plurality of banks, where generating the bank availability vector includes generating the bank availability vector based on the count value associated with each of the plurality of banks, for each clock cycle.

10. The method of claim 8, where determining the order for servicing the write requests includes:
 determining a servicing order for the plurality of banks, a first bank of the plurality of banks being included earlier, in the servicing order, than a second bank of the banks, a number of the write requests intended for the first bank being greater than a number of the write requests intended for the second bank.

11. The method of claim 10, further including servicing one of the write requests intended for the first bank before servicing another one of the write requests, that is intended for the second bank, when the first bank is available.

12. The method of claim 10, further including servicing one of the write requests, intended for the second bank, before servicing another one of the write requests, intended for the first bank, when the first bank is unavailable.

13. A system, comprising:
 a device to:
 receive requests intended for a memory that includes a plurality of banks, the requests including write requests;
 store the received requests in a queue;
 determine, after a particular number of write requests have been stored in the queue, a number of the requests intended for each of the plurality of banks based on addresses associated with the requests stored in the queue;
 generate a bank availability vector that indicates an availability of each bank, of the plurality of banks,
 determine a servicing order for servicing the plurality of banks, a number of the requests intended for a first bank, of the plurality of banks, being greater than a number of the requests intended for a second bank, of the plurality of banks, the first bank being included earlier in the servicing order than the second bank;
 determine, after determining the servicing order, whether a particular bank, of the plurality of banks, associated with a particular request that is first in the determined servicing order, is available,
 the device determining whether the particular bank is available based on a portion, of the bank availability vector, that is associated with the particular bank, and
 service the particular request for the particular bank when the particular request is available.

14. The system of claim 13, where the bank availability vector includes a plurality of bits,
 where each of the plurality of bits:
 is associated with a different one of the plurality of banks, and
 identifies an availability of the different one of the plurality of banks, and
 where, when determining whether the particular bank is available based on the portion, of the bank availability vector, that is associated with the particular bank, the device is to:
 determine whether the particular bank is available based on the bit, of the plurality of bits, that identifies the availability of the particular bank.

15. The method of claim 8, where the bank availability vector includes a quantity of bits that corresponds to a quantity of the plurality of banks,
 where each bit, of the quantity of bits, included in the bank availability vector, identifies an availability of a different one of the plurality of banks, and
 where determining whether the particular bank is available based on the portion, of the bank availability vector, that is associated with the particular bank includes:
 determining whether the particular bank is available based on the bit, of the quantity of bits, that identifies the availability of the particular bank.

16. The system of claim 13, where when the particular bank is not available, the device is further to:
 determine whether another bank, of the plurality of banks, associated with another request, of the requests, that is immediately after the particular request in the determined order, is available, where the device is to determine the other bank is available based on a portion of the bank availability vector that is associated with the second bank, and
 service the other request for the other bank when the other bank is available.

17. A non-transitory computer-readable medium comprising:
 one or more instructions which, when executed by one or more processors, cause the one or more processors to receive requests intended for a memory that includes a plurality of banks;
 one or more instructions which, when executed by the one or more processors, cause the one or more processors to store the received requests in a queue;
 one or more instructions which, when executed by the one or more processors, cause the one or more processors to generate information that indicates an availability of each bank of the plurality of banks;
 one or more instructions which, when executed by the one or more processors, cause the one or more processors to determine a number of the requests intended for each of the plurality of banks based on addresses associated with the requests stored in the queue;
 one or more instructions which, when executed by the one or more processors, cause the one or more processors to determine an order for the requests based on the determined number of the requests intended for each of the banks;

one or more instructions which, when executed by the one or more processors, cause the one or more processors to determine, after determining the order for the requests, whether a particular bank, of the plurality of banks, associated with a particular request of the requests, is available, the particular bank being first in the determined order, the one or more instructions to determine whether the particular bank is available include one or more instructions to determine whether the particular bank is available based on a portion, of the information, that is associated with the particular bank; and one or more instructions which, when executed by the one or more processors, cause the one or more processors to service the particular request for the particular bank when the particular bank is available.

18. The non-transitory computer-readable medium of claim 17, where the information includes a quantity of bits that corresponds to a quantity of the plurality of banks, where each bit, of the quantity of bits, identifies an availability of a different one of the plurality of banks, and where the one or more instructions to determine whether the particular bank is available based on a portion, of the information, that is associated with the particular bank include:

one or more instructions to determine whether the particular bank is available based on the bit, of the quantity of bits, that identifies the availability of the particular bank.

* * * * *